United States Patent Office 3,654,173
Patented Apr. 4, 1972

---

3,654,173
PROCESS FOR MAKING IMPROVED PHOSPHATE PHOSPHORS FROM MONETITE
Martha J. B. Thomas, Winchester, Ernest A. Dale, Hamilton, and Keith H. Butler, Marblehead, Mass., assignors to GTE Sylvania Incorporated
No Drawing. Continuation-in-part of application Ser. No. 819,949, Apr. 28, 1969. This application Apr. 14, 1971, Ser. No. 134,027
Int. Cl. C09k 1/36
U.S. Cl. 252—301.4 P
4 Claims

ABSTRACT OF THE DISCLOSURE

Improved phosphors are made by controlled heating of anhydrous calcium hydrogen phosphate particles, the particles being maintained in agglomeration-preventing motion throughout the heating process, to form calcium pyrophosphate which is then mixed with other phosphor raw materials and fired to form the phosphor.

CROSS-REFERENCES TO RELATED APPLICATIONS

This application is a continuation-in-part of Ser. No. 819,949, filed on Apr. 28, 1969, now abandoned.

In a copending application, filed on even date herewith by E. A. Dale and M. J. B. Thomas, entitled "Process For Making Improved Halophosphate Phosphors From Brushite," a process is disclosed for preparing phosphors from $CaHPO_4 \cdot 2H_2O$. The instant application relates to a process for preparing phosphors from $CaHPO_4$.

BACKGROUND OF THE INVENTION

Field of the invention

This invention relates to phosphors containing calcium and phosphate ions, such as pyro-, ortho- and halophosphate phosphors. It particularly relates to a process for making phosphors having improved luminescent properties.

Description of the prior art $CaHPO_4$ (monetite) is a material commonly used in the preparation of many different phosphors. In the manufacture of $CaHPO_4$, its hydrated analog $CaHPO_4 \cdot 2H_2O$ is first precipitated under controlled conditions to obtain a desired particle size from a solution containing phosphate ions and calcium ions, such as, for example, from a solution of $(NH_4)_2HPO_4$ and $CaCl_2$. Such a process is disclosed in U.S. Pat. 3,505,012, issued on Apr. 7, 1970 to E. A. Dale et al. and entitled "Process For Making the Brushite Form of Calcium Hydrogen Phosphate." The precipitate is then dehydrated by controlled heating in the mother liquor to a temperature between about 60° and 95° C. The $CaHPO_4$ thus produced was then washed, dried and could then be directly used in the preparation of phosphors.

In the preparation of such phosphors, $CaHPO_4$ was mixed with other raw materials, such as $CaCO_3$, $CaCl_2$, $CaF_2$, and with activating compounds such as $Sb_2O_3$. The mixing was then followed by controlled firing to yield luminescent materials.

During the firing process the following intermediate reaction would occur:

$$2CaHPO_4 \rightarrow Ca_2P_2O_7 + H_2O$$

The weight of water produced was 6.62% of the weight of $CaHPO_4$. The evolution of this water vapor could easily strip out some of the other constituents in the phosphor blend, such as chloride (in the form of HCl), phosphorus (in the form of POCl), antimony (in the form of $SbCl_3$ or $Sb_2O_3$), and the like, which, in turn, could upset the desired stoichiometry of the phosphor.

If the $CaHPO_4$ were converted to $Ca_2P_2O_7$, such as by firing in a crucible, before being blended into the phosphor mix, many of these problems could be eliminated. However, evolution of the water through the cake of $CaHPO_4$ could result in sintering and agglomeration of the particles, the effect of which would be to increase the average particle size of the resultant $Ca_2P_2O_7$. This, in turn, would reduce the efficiency and maintenance of phosphors produced therefrom, since those properties are highly dependent on the particle size of the phosphor.

Another disadvantage to the use of $CaHPO_4$ in the phosphor blend is that corrosive gases, resulting from the evolution of water and its reaction with other phosphor constituents, can be liberated into the controlled atmosphere of the phosphor furnace.

SUMMARY OF THE INVENTION

This invention discloses a process for producing $Ca_2P_2O_7$ from $CaHPO_4$ wherein the particle size and shape and the crystalline morphology of the resultant $Ca_2P_2O_7$ are substantially unchanged from that of the $CaHPO_4$. The $CaHPO_4$ employed in our process may be that disclosed above in 3,505,012, wherein brushite having a desired purity, reactivity and particle size is produced and then converted to the anhydrous monetite ($CaHPO_4$) by controlled heating of a slurry thereof.

The $CaHPO_4$ thus produced is then dried by, for example, centrifuging and then baking at 325° F. In the prior art this anhydrous $CaHPO_4$ would then be used as a starting material for phosphor synthesis by blending with other raw materials, as previously mentioned. However, we have discovered that if the $CaHPO_4$ particles are converted to $Ca_2P_2O_7$ before being blended with other raw materials, an improved phosphor will be produced. The conversion must be effected under such conditions that the particle size and shape and the crystalline morphology of the $Ca_2P_2O_7$ are substantially unchanged from that of the $CaHPO_4$.

The conversion is effected by heating the $CaHPO_4$ particles to a temperature that will produce $\gamma$—$Ca_2P_2O_7$, while the particles are maintained, throughout the heating process, in a motion that separates the particles from one another. The motion must be sufficient to prevent substantially any agglomeration or sintering together of the particles throughout the conversion process. That is to say, the motion must be sufficient to prevent any clustering together of particles that would result in an increased particle size when determined by, for example, sedimentation analysis or a Fisher Sub Sieve Sizer. The heating temperature should be in the range of about 420° C. to 750° C., the lower temperature being that necessary to attain substantially complete conversion. Above about 750° C., $\beta$—$Ca_2P_2O_7$ will be formed, instead of the desired $\gamma$—$Ca_2P_2O_7$; $\gamma$—$Ca_2P_2O_7$ is preferred since it has higher reactivity in the solid state than the $\beta$ form and results in phosphors having better luminescent properties than phosphors prepared from $\beta$—$Ca_2P_2O_7$.

DESCRIPTION OF THE PREFERRED EMBODIMENT

A precipitate of $CaHPO_4 \cdot 2H_2O$ was prepared as disclosed in 3,505,012 and was then converted to $CaHPO_4$ by heating the slurry as mentioned in the patent. The $CaHPO_4$ was then centrifuged and dried at 325° F. The dried $CaHPO_4$ was then charged into one end of a stainless steel, rotary, gas heated kiln, the kiln having a diameter of 6½ inches and a length of 7 feet. The kiln was inclined at a horizontal angle of 5° and was rotated at a speed of 8 r.p.m. At a kiln temperature of 540° C., the $CaHPO_4$ was converted to $Ca_2P_2O_7$ in one pass, the residence time of the powder in the kiln being about 8 minutes at a charge rate of 25 pounds per hour. The motion of the individual particles of powder within the kiln was a combination of sliding, rotating and tumbling, and was sufficient to prevent substantially any agglomeration or sintering together of the particles.

A halophosphate phosphor was made from the $Ca_2P_2O_7$ so produced and was tested in fluorescent lamps. The results were compared with those of fluorescent lamps having the same halophosphate phosphor, but which was prepared from $CaHPO_4$ instead of $Ca_2P_2O_7$. In Test No. 1, the $Ca_2P_2O_7$ lamps had an initial output of 3146 lumens versus 3115 lumens for the $CaHPO_4$ lamps, a gain of 35 lumens; after 100 hours of operation, the output of each was 3051 and 3016 lumens, respectively, the gain remaining 35 lumens. In Test No. 2, the same respective gain was 6 lumens initially and 11 lumens after 100 hours. Heating means other than a rotary kiln could also be used to convert $CaHPO_4$ into $Ca_2P_2O_7$ in accordance with this invention. For example, the powder could be maintained in agitation in a fluidized bed while being heated to the conversion temperature. The powder charge therein and rate of gas flow through the bed would, of course, have to be such as to maintain sufficient agitation of the powder to prevent substantially any agglomeration or sintering together of the particles.

The following are offered as examples of pyro-, ortho-, and halo-phosphate phosphors made in accordance with this invention. In all the examples, the $Ca_2P_2O_7$ was prepared from $CaHPO_4$ as described above.

EXAMPLE 1

Pyrophosphate phosphor: $Ca_{1.96}P_2O_7:Eu^{+2}_{.04}$

Raw material: Weight in grams

| | |
|---|---|
| $Ca_2P_2O_7$ | 498 |
| $Eu_2O_3$ | 14 |
| $(NH_4)_2HPO_4$ | 10.8 |

The above quantities of raw materials are thoroughly mixed and then fired for 2 hours at 1250° C. in air and then for 1 hour at 1220° C. in 1%$H_2$–99%$N_2$ to form the phosphor.

EXAMPLE 2

Orthophosphate phosphor: $Ca_{2.55}Zn_{.21}Mg_{.08}(PO_4)_2:Sn_{.02}$

Raw material: Weight in grams

| | |
|---|---|
| $Ca_2P_2O_7$ | 254 |
| $CaCO_3$ | 55 |
| $MgCO_3$ | 6.7 |
| $ZnO$ | 17.1 |
| $SnO_2$ | 3 |

The above materials are thoroughly mixed and fired at 2000° F. for 2½ hours in 8%$H_2$–92%$N_2$.

EXAMPLE 3

Halophosphate phosphor: $Ca_{4.66}F_{.9}(PO_4)_3:Sb_{.04}$

Raw material: Weight in grams

| | |
|---|---|
| $Ca_2P_2O_7$ | 12,578 |
| $CaF_2$ | 1,160 |
| $CaCO_3$ | 3,997 |
| $Sb_2O_3$ | 192 |

The materials are thoroughly mixed and fired at 2200° F. for 1½ hours in air. This phosphor was used in the test above.

EXAMPLE 4

Halophosphate phosphor:
$Ca_{4.64}Cd_{.06}F_{.835}Cl_{.19}(PO_4)_3:Sb_{.09}Mn_{.089}$ Raw material: Weight in grams

| | |
|---|---|
| $Ca_2P_2O_7$ | 12,578 |
| $CaCO_3$ | 4,038 |
| $CaF_2$ | 1,076 |
| $NH_4Cl$ | 335 |
| $MnCO_3$ | 363 |
| $Sb_2O_3$ | 433 |
| $CdO$ | 254 |

The materials are thoroughly mixed and fired at 2125° F. for 3½ hours in nitrogen.

We claim:

1. In a process for making a pyro-, ortho- or halophosphate phosphor containing phosphate and calcium ions, the steps which comprise; precipitating $$CaHPO_4 \cdot 2H_2O$$

from a solution containing calcium ions and phosphate ions; eliminating the water of hydration from the $$CaHPO_4 \cdot 2H_2O$$

to form anhydrous $CaHPO_4$; drying the $CaHPO_4$; heating the $CaHPO_4$, while maintaining it in agglomeration-preventing motion to a temperature sufficient to convert it into $\gamma$—$Ca_2P_2O_7$; mixing the $\gamma$—$Ca_2P_2O_7$ with other phosphor raw materials; and firing the mixture to form a phosphor.

2. The process of claim 1 wherein said heating is at a temperature between about 420° C. and 750° C.

3. The process of claim 2 wherein said agglomeration-preventing motion is obtained by heating the $CaHPO_4$ in an inclined, rotating kiln.

4. The process of claim 2 wherein said agglomeration-prevention motion is obtained by heating the $CaHPO_4$ in a fluidized bed.

References Cited

UNITED STATES PATENTS

| | | | |
|---|---|---|---|
| 3,505,012 | 4/1970 | Dale et al. | 252—301.4 P |
| 3,549,553 | 12/1970 | Wachtel | 252—301.4 P |

ROBERT D. EDMONDS, Primary Examiner